US011104852B2

(12) United States Patent
Marker et al.

(10) Patent No.: US 11,104,852 B2
(45) Date of Patent: Aug. 31, 2021

(54) FLUIDIZED BED PROCESSES AND CATALYST SYSTEMS FOR FISCHER-TROPSCH CONVERSION

(71) Applicant: Gas Technology Institute, Des Plaines, IL (US)

(72) Inventors: Terry Marker, Palos Heights, IL (US); Jim Wangerow, Oak Park, IL (US); Pedro Ortiz-Toral, Wheeling, IL (US); Martin Linck, Roscoe, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 16/405,364

(22) Filed: May 7, 2019

(65) Prior Publication Data

US 2020/0032146 A1 Jan. 30, 2020

Related U.S. Application Data

(60) Provisional application No. 62/711,103, filed on Jul. 27, 2018.

(51) Int. Cl.
| | | |
|---|---|---|
| *C10G 2/00* | (2006.01) | |
| *C10G 11/02* | (2006.01) | |
| *C10G 11/14* | (2006.01) | |
| *B01J 8/24* | (2006.01) | |
| *B01J 21/04* | (2006.01) | |
| *C10G 11/18* | (2006.01) | |
| *C10G 11/04* | (2006.01) | |
| *C10G 47/30* | (2006.01) | |
| *C10G 11/05* | (2006.01) | |

(52) U.S. Cl.
CPC ............. *C10G 2/332* (2013.01); *B01J 8/24* (2013.01); *B01J 21/04* (2013.01); *C10G 2/344* (2013.01); *C10G 11/02* (2013.01); *C10G 11/04* (2013.01); *C10G 11/05* (2013.01); *C10G 11/18* (2013.01); *C10G 47/30* (2013.01); *C10G 2400/02* (2013.01); *C10G 2400/04* (2013.01)

(58) Field of Classification Search
None
See application file for complete search history.

(56) References Cited

U.S. PATENT DOCUMENTS

| | | |
|---|---|---|
| 4,906,671 A | 3/1990 | Haag et al. |
| 2009/0124712 A1* | 5/2009 | De Figueiredo Costa ................. C10G 2/33 518/714 |
| 2010/0144907 A1 | 6/2010 | Kibby et al. |
| 2011/0118368 A1* | 5/2011 | Kibby ................. B01J 35/0006 518/716 |
| 2013/0253079 A1* | 9/2013 | Jothimurugesan ....... B01J 29/80 518/715 |
| 2015/0105236 A1 | 4/2015 | Jothimurugesan et al. |
| 2019/0016964 A1* | 1/2019 | Ge ............................ B01J 37/08 |
| 2019/0144765 A1* | 5/2019 | Marker ................. C10G 47/32 585/899 |

FOREIGN PATENT DOCUMENTS

| | | |
|---|---|---|
| EP | 099715 A1 | 2/1984 |
| EP | 2055380 A1 | 5/2009 |
| WO | 2004041969 A1 | 5/2004 |
| WO | 2011082037 A3 | 7/2011 |

OTHER PUBLICATIONS

Rane, N. J. "Hydrocarbon conversion over Brønsted and Lewis acidic zeolites" 2007, pp. 1-173 (Year: 2007).*

* cited by examiner

*Primary Examiner* — Medhanit W Bahta
(74) *Attorney, Agent, or Firm* — Banner & Witcoff, Ltd.

(57) ABSTRACT

Processes and catalyst systems are disclosed for performing Fischer-Tropsch (FT) synthesis to produce $C_4^+$ hydrocarbons, such as gasoline boiling-range hydrocarbons and/or diesel boiling-range hydrocarbons. Advantageously, catalyst systems described herein have additional activity (beyond FT activity) for in situ hydroisomerization and/or hydrocracking of wax that is generated according to the distribution of hydrocarbons obtained from the FT synthesis reaction. This not only improves the yield of hydrocarbons (e.g., $C_{4-19}$ hydrocarbons) that are useful for transportation fuels, but also allows for alternative reactor types, such as a fluidized bed reactor.

20 Claims, No Drawings

FLUIDIZED BED PROCESSES AND CATALYST SYSTEMS FOR FISCHER-TROPSCH CONVERSION

CROSS-REFERENCE TO RELATED APPLICATIONS

This application claims priority to U.S. provisional application No. 62/711,103, filed Jul. 27, 2018, which is incorporated by reference in its entirely.

FIELD OF THE INVENTION

Aspects of the invention relate to the use of a fluidized bed reactor, in combination with a catalyst mixture or bi-functional catalyst, for performing a Fischer-Tropsch synthesis reaction in the production of liquid hydrocarbons (e.g., gasoline boiling-range hydrocarbons and/or diesel boiling-range hydrocarbons).

DESCRIPTION OF RELATED ART

The ongoing search for alternatives to crude oil, for the production of hydrocarbon fuels is increasingly driven by a number of factors. These include diminishing petroleum reserves, higher anticipated energy demands, and heightened concerns over greenhouse gas (GHG) emissions from sources of non-renewable carbon. In view of its abundance in natural gas reserves, as well as in gas streams obtained from biological sources (biogas), methane has become the focus of a number of possible routes for providing liquid hydrocarbons. A key commercial process for converting methane into fuels involves a first conversion step to produce synthesis gas (syngas), followed by a second, downstream Fischer-Tropsch (FT) conversion step.

With respect to the first conversion step, known processes for the production of syngas from methane include partial oxidation reforming and autothermal reforming (ATR), based on the exothermic oxidation of methane with oxygen. Steam methane reforming (SMR), in contrast, uses steam as the oxidizing agent, such that the thermodynamics are significantly different, not only because the production of steam itself can require an energy investment, but also because reactions involving methane and water are endothermic. More recently, it has also been proposed to use carbon dioxide ($CO_2$) as the oxidizing agent for methane, such that the desired syngas is formed by the reaction of carbon in its most oxidized form ($CO_2$) with carbon in its most reduced form ($CH_4$). This reaction has been termed the "dry reforming" of methane, and because it is highly endothermic, thermodynamics for the dry reforming of methane are less favorable compared to ATR or even SMR. However, the stoichiometric consumption of one mole of carbon dioxide per mole of methane has the potential to reduce the overall carbon footprint of liquid fuel production, providing a "greener" consumption of methane.

In the second step involving FT conversion, the synthesis gas containing a mixture of hydrogen ($H_2$) and carbon monoxide (CO) is subjected to successive cleavage of C—O bonds and formation of C—C bonds with the incorporation of hydrogen. This mechanism provides for the formation of hydrocarbons, and particularly straight-chain alkanes, with a distribution of molecular weights that can be controlled to some extent by varying the FT reaction conditions and catalyst properties. Such properties include pore size and other characteristics of the support material. The choice of catalyst can impact FT product yields in other respects. For example, iron-based FT catalysts tend to produce more oxygenates, whereas ruthenium as the active metal tends to produce exclusively paraffins.

At economical levels of conversion to desired hydrocarbons, particularly gasoline boiling-range hydrocarbons and/or diesel boiling-range hydrocarbons, the FT reaction invariably leads to the co-formation of higher molecular weight hydrocarbons that are solid at room temperature and generally referred to as "wax." This is a consequence of the FT reaction chemistry, according to which chain growth to produce molecules of successively higher molecular weight occurs with some finite probability at each carbon addition step. The production of wax adds significantly to the process complexity, in terms of the further processing requirement to convert this wax, for example in a separate hydrocracking step, to the desired hydrocarbons. Moreover, the difficulties associated with removing the wax byproduct from the FT catalyst impose limitations on the possible reactor types that can be used. That is, the problem of wax formation makes it impractical to use certain reactors that would otherwise be an ideal selection for use in FT synthesis.

SUMMARY OF THE INVENTION

Aspects of the invention are associated with the discovery of processes for producing $C_4^+$ hydrocarbons, such as gasoline boiling-range hydrocarbons and/or diesel boiling-range hydrocarbons, using catalyst systems having activity for catalyzing both (i) the Fischer-Tropsch (FT) synthesis reaction and (ii) hydroisomerization and/or hydrocracking of wax for its conversion to more desirable hydrocarbons that are not solid at room temperature. Accordingly, such catalyst systems allow for the in situ dewaxing of the distribution of hydrocarbons produced by the FT synthesis reaction alone. This can advantageously overcome the need for a separate dewaxing step, downstream of the FT synthesis reaction, such as a conventional FT wax hydrocracking step.

Moreover, such catalyst systems broaden the possible reactor types that may be used for the FT synthesis reaction. Importantly, representative processes can employ a fluidized bed reactor (e.g., bubbling fluidized bed reactor), which would otherwise be incapable of allowing for the continuous removal (elutriation) of the amount of normal $C_{20}^+$ hydrocarbons (in a wax fraction), in the FT product, in the absence of in situ dewaxing. The low volatilities of such hydrocarbons prevent their vaporization into the gaseous product stream exiting a bubbling fluidized bed of catalyst particles, as necessary for the operation of this reactor type. Advantages of using a fluidized bed reactor for the FT synthesis reaction include excellent mixing and temperature uniformity, which are particularly beneficial in the highly exothermic reaction environment, as well as efficient gas/solids disengagement above the fluidized catalyst particle bed.

In some embodiments, the catalyst systems comprise an FT-functional constituent and a dewaxing-functional constituent, with these constituents being present in separate types of catalysts or otherwise present in a single, bi-functional catalyst. Under suitable reaction conditions as described herein, the catalyst systems catalyze both FT synthesis and dewaxing to provide an FT product that is substantially free of wax (e.g., comprises less than about 1 wt-% hydrocarbons that are solid at room temperature). In view of such catalyst systems, further aspects of the invention are associated with the discovery that (i) the FT synthesis reaction, for converting $H_2$ and CO in a synthesis gas feed to a distribution of hydrocarbons, and (ii) a dewaxing reaction, for converting normal $C_{20}^+$ hydrocarbons by hydroisomerization and/or hydrocracking to normal or branched $C_4$-$C_{19}$ hydrocarbons, can be performed effectively under the same set of conditions and within the same reactor. This can vastly simplify the FT synthesis reaction, compared to conventional processes for performing this reaction, particularly in view of the separate dewaxing step required in such processes. Significant capital and/or operating cost advantages, associated with processes and catalyst systems of the present invention, can thereby be realized.

These and other embodiments, aspects, and advantages relating to the present invention are apparent from the following Detailed Description.

DETAILED DESCRIPTION

The expressions "wt-%" and "mol-%," are used herein to designate weight percentages and molar percentages, respectively. For ideal gases, "mol-%" is equal to percentage by volume.

As used herein, terms such as "$C_4^+$ hydrocarbons," "$C_{20}^+$ hydrocarbons," "$C_4$-$C_{19}$ hydrocarbons," etc. refer to hydrocarbons having greater than 4 carbon atoms, hydrocarbons having greater than 20 carbon atoms, hydrocarbons having from 4 to 19 carbon atoms, etc., respectively. Unless otherwise stated, these terms do not imply that hydrocarbons having all carbon numbers according to the specified ranges must necessarily be present. Unless otherwise stated, e.g., by the designation "normal $C_{20}^+$ hydrocarbons," such terms are meant to encompass hydrocarbons of all types (e.g., normal, branched, aromatic, naphthenic, olefinic, etc.).

The terms "naphtha boiling-range hydrocarbons" and "gasoline boiling-range hydrocarbons" refer to a hydrocarbon fraction comprising hydrocarbons having boiling points within an initial ("front-end") distillation temperature of 35° C. (95° F.), characteristic of $C_5$ hydrocarbons, and an end point distillation temperature of 204° C. (399° F.). The term "jet fuel boiling-range hydrocarbons" refers to a hydrocarbon fraction comprising hydrocarbons having boiling points within a front-end distillation temperature of 204° C. (399° F.) and an end point distillation temperature of 271° C. (520° F.). The term "diesel boiling-range hydrocarbons" refers to a hydrocarbon fraction comprising hydrocarbons having boiling points within a front-end distillation temperature of 204° C. (399° F.) and an end point distillation temperature of 344° C. (651° F.). Accordingly, "diesel boiling-range hydrocarbons" encompass "jet fuel boiling-range hydrocarbons," but also include "heavy diesel boiling-range hydrocarbons" having boiling points within a front-end distillation temperature of 271° C. (520° F.) and an end point distillation temperature of 344° C. (651° F.). The term "VGO boiling-range hydrocarbons" refers to a hydrocarbon fraction comprising hydrocarbons having boiling points within a front-end distillation temperature of 344° C. (651° F.) and an end point distillation temperature of 538° C. (1000° F.). These front end and end point distillation temperatures of hydrocarbon fractions, such as naphtha boiling-range hydrocarbons, gasoline boiling-range hydrocarbons, jet fuel boiling-range hydrocarbons, and diesel boiling-range hydrocarbons, which are also characteristic of respective petroleum derived naphtha, gasoline, jet fuel, and diesel boiling-range fractions, are determined according to ASTM D86, with the end point being the 95% recovery value.

The term "substantially," as used in the phrase "substantially the same" or "substantially equal," in reference to a given parameter, is meant to encompass values or ratios that deviate by less than 5%. The term "substantially all" or "substantially all of" means "at least 95% of." The term "substantially complete" means "at least 95% complete."

Fluidized Bed Processes for FT Synthesis

Embodiments of the invention are directed to fluidized bed processes for producing $C_4^+$ hydrocarbons, which are understood to include liquid hydrocarbons suitable for transportation fuels, such as gasoline, jet fuel, and/or diesel fuel, or blending components for transportation fuels. Whereas the $C_4$ hydrocarbon butane is not a liquid at room temperature in its pure form, it is nonetheless a suitable component of gasoline. A representative process comprises, in a fluidized bed reactor containing a catalyst mixture or a bi-functional catalyst and operating under Fischer-Tropsch (FT) reaction conditions, converting $H_2$ and CO in a synthesis gas feed to hydrocarbons, including the $C_4^+$ hydrocarbons (i.e., at least some hydrocarbons having four or more carbon atoms), which are provided in an FT product. These $C_4^+$ hydrocarbons include those in the distribution of hydrocarbons, obtained from conversion by the FT synthesis reaction, which distribution can also initially include a wax fraction comprising normal $C_{20}^+$ hydrocarbons (i.e., at least some normal or straight-chain hydrocarbons having 20 or more carbon atoms that are consequently solid at room temperature), as described above. These $C_4^+$ hydrocarbons in the FT product can also include those in the distribution obtained from FT synthesis, but after having been further converted by hydroisomerization and/or hydrocracking, due to catalytic activity for these additional reactions provided by the catalyst system.

Advantageously, it has been discovered that, under conditions suitable for conversion by the FT synthesis reaction, catalyst systems as described herein are additionally effective for hydroisomerization and/or hydrocracking of the wax fraction obtained from FT synthesis. For example, the catalyst systems may result in the in situ conversion of at least a portion of the normal $C_{20}^+$ hydrocarbons to normal or branched $C_4$-$C_{19}$ hydrocarbons (i.e., to normal or branched hydrocarbons, at least some of which have 4 to 19 carbon atoms). This additional activity allows for the possibility of providing an FT product from a single reaction stage with in situ dewaxing, such that the FT product comprises little or no wax (e.g., comprises less than about 1 wt-% wax, or less than about 0.5 wt-% wax). Accordingly, a conventional, separate dewaxing step may be avoided.

Yet another advantage of catalyst systems that can substantially reduce or eliminate wax in a single reaction stage resides in the possibility of performing the FT synthesis reaction in a fluidized bed reactor. Whereas this reactor type is generally unsuitable for conventional FT synthesis because the solid wax fraction is difficult to elutriate, processes as described herein, operating with the absence of any substantial net production of wax, can exploit the advantages of a fluidized bed in terms of its temperature uniformity and good mixing characteristics, resulting in improved product quality control. Fluidization may be established by flowing the $H_2$- and CO-containing synthesis gas upwardly through the bed of solid particles of the catalyst mixture or bi-functional catalyst. The synthesis gas feed, and optionally any recycle portion of the FT product (as described below), may be used as the fluidizing gas, or otherwise may be used in combination with a supplemental fluidizing gas (e.g., an inert gas such as nitrogen) to increase superficial velocity of the fluidizing gas. Depending on this superficial velocity, in combination with all other variables governing the hydrodynamics of the reaction system (including gas density, particle density, and particle size), various fluidization regimes of the bed may be achieved. More particularly, in order of increasing superficial velocity, these regimes include fixed, bubbleless, bubbling, slugging, turbulent, or fast fluidized bed, and are described, for example, in Wen, C. Y. ("*Flow Regimes and Flow Models for Fluidized Bed Reactors*," RECENT ADV. ENG. ANAL. CHEM. REACT. SYST. (1984): 256-290) A circulating fluidized bed system may also be employed. Preferably, the fluidized bed reactor is operated with a fixed, bubbleless, bubbling, or slugging fluidized bed of solid particles of the catalyst mixture or bi-functional catalyst. More preferred is a bubbling fluidized bed.

The FT product is removed or withdrawn from the reactor, generally as a continuous vapor stream. For example, the FT product may be disengaged from the fluidized bed of the catalyst mixture or bi-functional catalyst, in an expanded solids disengagement section above the fluidized bed. This disengagement section may be configured, more particularly, as a section of expanded reactor diameter or cross-sectional area, relative to the diameter or cross-sectional area of the fluidized bed. The height of such expanded disengagement section may extend to, or above, the transport disengaging height, TDH to promote disengaging of substantially all of the FT product from substantially all of the solid particles of the catalyst bed.

Other gas-solids separation devices (e.g., mechanical devices such as filters, cyclones, etc.) may be employed in place of, but preferably in combination with, the use of an expanded solids disengagement section. Such devices may be used within this section or otherwise external to this section, following disengagement and therefore with the device(s) acting on the disengaged FT product. For example, the efficiency or degree of gas-solids disengagement may be improved using one or more cyclones within the disengagement section. Effective disengagement, whether or not accompanied by separation devices, does not preclude the existence of minor amounts of solid particles that become entrained in the FT product, and in particular fine particles of catalyst resulting from mechanical breakage or attrition. Such fine solid particles may be more completely removed in further separation steps, for example using a filter of sufficiently small pore size (e.g., a microfilter).

Accordingly, representative fluidized bed processes for performing an FT synthesis reaction may comprise flowing a synthesis gas feed comprising $H_2$ and CO through a bed of solid particles of a catalyst mixture or bi-functional catalyst, thereby causing fluidization of the bed. Under the reaction conditions at which the synthesis gas and solid particles are contacted, corresponding to the FT reaction conditions used in the fluidized bed reactor, the catalyst mixture or bi-functional catalyst has activity for catalyzing at least two types of reactions. These reactions are namely (i) converting, by the Fischer-Tropsch (FT) synthesis reaction, the $H_2$ and CO to a distribution of hydrocarbons, with this distribution including an initial wax fraction comprising normal $C_{20}^+$ hydrocarbons, in addition to (ii) converting, by hydroisomerization and/or hydrocracking of the normal $C_{20}^+$ hydrocarbons, at least a portion, but preferably a substantial amount (e.g., at least about 75 wt-%) of the normal $C_{20}^+$ hydrocarbons to normal or branched $C_4$-$C_{19}$ hydrocarbons. Advantageously, the activities for catalyzing reactions (i) and (ii), in combination, provide a Fischer-Tropsch (FT) product comprising $C_4^+$ hydrocarbons but with a substantially reduced amount of wax relative to that generated by the FT synthesis reaction alone, for example an FT product comprising less than about 5 wt-%, or even less than about 1 wt-%, of hydrocarbons that are solid at room temperature. The fluidized bed processes may further comprise disengaging substantially all of the FT product from substantially all of said solid particles, as described above. Following disengagement of the FT product, it may be subjected to cooling to condense a liquid fraction of this product, comprising hydrocarbons, and optionally separating these hydrocarbons (e.g., by fractionation) to resolve one or more product fractions, such as those comprising all, or substantially all, gasoline boiling-range hydrocarbons, jet fuel boiling-range hydrocarbons, diesel boiling-range hydrocarbons, or VGO boiling-range hydrocarbons.

Catalyst Systems, Providing Both FT Conversion Activity and Dewaxing Activity

Catalyst systems for providing activities for both FT conversion and in situ dewaxing (hydroisomerization and/or hydrocracking) may include a catalyst mixture comprising two catalyst types or otherwise a bi-functional catalyst comprising two types of functional constituents. In the case of a catalyst mixture, the catalyst types may be both a Fischer-Tropsch (FT) catalyst and dewaxing catalyst, as well as optionally one or more other catalyst types. Likewise, in the case of a bi-functional catalyst, the functional constituents may be both an FT-functional constituent and a dewaxing-functional constituent, as well as optionally one or more other types of functional constituents. The catalyst types of a catalyst mixture, or otherwise the functional constituents of a bi-functional catalyst, may be present in equal or substantially equal weight ratios. For example, the (i) FT catalyst and (ii) dewaxing catalyst may be present in the catalyst mixture in a weight ratio of (i):(ii) of about 1:1. Otherwise, the (i) FT-functional constituent and (ii) dewaxing-functional constituent may be present in the bi-functional catalyst in a weight ratio of (i):(ii) of about 1:1. Generally, however, these weight ratios may vary, for example the weight ratios of (i):(ii) in each case may be from about 10:1 to about 1:10, such as from about 5:1 to about 1:5, or from about 3:1 to about 1:3.

The FT catalyst of a catalyst mixture, or otherwise the FT-functional constituent of a bifunctional catalyst, may comprise one or more FT active metals, or metals suitable for catalyzing the FT synthesis reaction under reaction conditions as described herein. Such FT active metals include transition metals selected from cobalt (Co), iron (Fe), ruthenium (Ru), and nickel (Ni). A preferred FT catalyst, or FT-functional constituent, comprises at least about 10 wt-% of the transition metal(s), and typically at least about 15 wt-% of the transition metal(s) (e.g., from about 10 wt-% to about 40 wt-% or from about 15 wt-% to about 30 wt-% of the transition metals, such as Co). In the case of an FT-functional constituent of a bi-functional catalyst, such bi-functional catalyst as a whole may comprise such transition metal(s) in lower amount, such as in an amount of at least about 3 wt-% (e.g., from about 3 wt-% to about 30 wt-%), and typically at least about 5 wt-% (e.g., from about 5 wt-% to about 25 wt-%), based on the weight of the bi-functional catalyst. Whether present in an FT catalyst, or an FT-functional constituent, such transition metal(s) may be disposed or deposited on a solid support, which is intended to encompass catalysts in which the active metal(s) is/are on the support surface and/or within a porous internal structure of the support. Therefore, in addition to the FT active metal(s), representative FT-catalysts and FT-functional constituents may further comprise a solid support, with exemplary solid supports comprising one or more metal oxides, such as those selected from the group consisting of aluminum oxide, silicon oxide, titanium oxide, zirconium oxide, magnesium oxide, strontium oxide, etc. The solid support of an FT catalyst or an FT-functional constituent may comprise all, or substantially all (e.g., greater than about 95 wt-%), of the one or more of such metal oxides. Preferred FT catalysts or FT-functional constituents comprise the transition metal cobalt (Co) in the above amounts (e.g., at least about 10 wt-%) on a support comprising aluminum oxide (alumina).

As described above, representative catalyst mixtures or bi-functional catalysts advantageously have activity for hydroisomerization and/or hydrocracking of normal $C_{20}^+$ hydrocarbons, which is also characteristic of activity for converting wax (i.e., converting straight-chain hydrocarbons that are solid at room temperature to branched and/or lower carbon number hydrocarbons that are not solid at room temperature). In view of this activity, a second catalyst of the catalyst mixture may be referred to as a dewaxing catalyst, or a second constituent of a bi-functional catalyst may be referred to as a dewaxing-functional constituent. Examples of such dewaxing catalysts or dewaxing-functional constituents comprise at least one dewaxing active (e.g., hydroisomerization and/or hydrocracking active) metal suitable for catalyzing dewaxing reactions under the same reaction conditions as used for catalyzing the FT synthesis reactions. The dewaxing active metal(s) may be disposed or deposited on a solid support, which is intended to encompass catalysts in which the active metal(s) is/are on the support surface and/or within a porous internal structure of the support. Representative dewaxing active metals may be selected from the Groups 12-14 of the Periodic Table, such as from Group 13 or Group 14 of the Periodic Table. A particular dewaxing active metal is gallium. The at least one dewaxing active metal may be present in an amount, for example, from about 0.1 wt-% to about 3 wt-%, or from about 0.5 wt-% to about 2 wt-%, based on the weight of the dewaxing catalyst or dewaxing-functional constituent. If a combination of dewaxing active metals are used, such as a combination of metals selected from Groups 12-14 of the Periodic Table, then such metals may be present in a combined amount within these ranges, based on the weight of the dewaxing catalyst or dewaxing-functional constituent. In the case of an dewaxing-functional constituent of a bi-functional catalyst, such bi-functional catalyst as a whole may comprise such dewaxing active metal(s) in lower amount, such as in an amount from about 0.03 wt-% to about 2 wt-%, or from about 0.1 wt-% to about 1 wt-%, based on the weight of the bi-functional catalyst. Generally, the dewaxing catalysts or dewaxing-functional constituents may comprise no metal(s) on the support in an amount, or combined amount, of greater than about 1 wt-%, or greater than about 0.5 wt-%, based on the weight of the dewaxing catalyst or dewaxing-functional constituent (or optionally based on the weight of a bi-functional catalyst as a whole), other than the dewaxing active metal(s) described above (e.g., no metals other than metals of Groups 12-14 of the Periodic Table, no metals other than metals of Groups 13 or Group 14 of the Periodic Table, or no metals other than gallium, in this amount or combined amount). Preferably, the dewaxing catalyst or dewaxing-functional constituent (or optionally the bi-functional catalyst as a whole) comprises no metals on the support, other than the dewaxing active metal(s) described above (e.g., no metals other than metals of Groups 12-14 of the Periodic Table, no metals other than metals of Groups 13 or Group 14 of the Periodic Table, or no metals other than gallium).

In addition to the dewaxing active metal(s), representative dewaxing catalysts and dewaxing-functional constituents may further comprise a solid support, with representative solid supports being, in particular, solid acidic supports in order to promote hydrocracking activity. The acidity of a support may be determined, for example, by temperature programmed desorption (TPD) of a quantity of ammonia (ammonia TPD), from an ammonia-saturated sample of the support, over a temperature from 275° C. (527° F.) to 500° C. (932° F.), which is beyond the temperature at which the ammonia is physisorbed. The quantity of acid sites, in units of millimoles of acid sites per gram (mmol/g) of support, therefore corresponds to the number of millimoles of ammonia that is desorbed per gram of support in this temperature range. A representative solid support comprises a zeolitic or non-zeolitic molecular sieve and has at least about 15 mmol/g (e.g., from about 15 to about 75 mmol/g) of acid sites, or at least about 25 mmol/g (e.g., from about 25 to about 65 mmol/g) of acid sites, measured by ammonia TPD. In the case of zeolitic molecular sieves, acidity is a function of the silica to alumina ($SiO_2/Al_2O_3$) molar framework ratio, and, in embodiments in which the solid support comprises a zeolitic molecular sieve (zeolite), its silica to alumina molar framework ratio may be less than about 60 (e.g., from about 1 to about 60), or less than about 40 (e.g., from about 5 to about 40). Particular solid supports may comprise one or more zeolitic molecular sieves (zeolites) having a structure type selected from the group consisting of FAU, FER, MEL, MTW, MWW, MOR, BEA, LTL, MFI, LTA, EMT, ERI, MAZ, MEI, and TON, and preferably selected from one or more of FAU, FER, MWW, MOR, BEA, LTL, and MFI. The structures of zeolites having these and other structure types are described, and further references are provided, in Meier, W. M, et al., *Atlas of Zeolite Structure Types*, 4$^{th}$ Ed., Elsevier: Boston (1996). Specific examples include zeolite Y (FAU structure), zeolite X (FAU structure), MCM-22 (MWW structure), and ZSM-5 (MFI structure), with ZSM-5 and zeolite beta (BEA structure) being exemplary.

Solid supports other than zeolitic and non-zeolitic molecular sieves include metal oxides, such as any one or more of silica, alumina, titania, zirconia, magnesium oxide, calcium oxide, strontium oxide, etc. In representative embodiments, the solid support may comprise (i) a single type of zeolitic molecular sieve, (ii) a single type of non-zeolitic molecular sieve, or (iii) a single type of metal oxide, wherein (i), (ii), or (iii) is present in an amount greater than about 75 wt-% (e.g., from about 75 wt-% to about 99.9 wt-%) or greater than about 90 wt-% (e.g., from about 90 wt-% to about 99 wt-%), based on the weight of the dewaxing catalyst or dewaxing-active functional constituent (or optionally based on the weight of the bi-functional catalyst as a whole). Other components of the support, such as binders and other additives, may be present in minor amounts, such as in an amount, or combined amount, of less than about 10 wt-% (e.g., from about 1 wt-% to about 10 wt-%), based on the weight of the dewaxing catalyst or dewaxing-active functional constituent (or optionally based on the weight of the bi-functional catalyst as a whole). An exemplary dewaxing catalyst, or dewaxing-functional constituent, comprises gallium as the dewaxing active metal, present in an amount as described above (e.g., from about 0.5 wt-% to about 2 wt-%, such as about 1 wt-%, based on the weight of the dewaxing catalyst) on a support comprising, or possibly consisting essentially of, ZSM-5. Representative silica to alumina molar framework ratios of the ZSM-5 are described above. In yet further embodiments, the dewaxing catalyst, or dewaxing-functional constituent, may comprise a solid support, such as a solid acidic support as described above, without any dewaxing active metal (e.g., gallium) as described above.

In general, a representative catalyst mixture may comprise (i) an FT catalyst comprising one or both of (a) one or more FT active metals and (b) an FT catalyst support comprising one or more metal oxides, and (ii) a dewaxing catalyst comprising one or both of (a) one or more dewaxing active metals and (b) a solid acidic support. A representative bi-functional catalyst may comprise (i) an FT functional constituent comprising one or both of (a) one or more FT active metals and (b) one or more metal oxides, and (ii) a dewaxing-functional constituent comprising one or both of (a) one or more dewaxing active metals and (b) a solid acidic support. In either case of a catalyst mixture or bi-functional catalyst, (i) and (ii) may be present in the weight ratios as described above (e.g., from about 3:1 to about 1:3).

FT Synthesis Reaction with In Situ Dewaxing, Conditions and Performance

In the FT reactor (e.g., fluidized bed reactor), at least a portion of the $H_2$ and CO in the synthesis gas product are converted to hydrocarbons according to the Fischer-Tropsch (FT) synthesis reaction, which may be generalized as:

$$(2n+1)H_2 + nCO \rightarrow C_nH_{2n+2} + nH_2O.$$

Conditions in the FT reactor are therefore suitable for the synthesis of hydrocarbons according to this reaction, including $C_4^+$ hydrocarbons that are useful as liquid fuels or blending components of liquid fuels. In representative embodiments, FT reaction conditions (suitable for catalyzing both the FT synthesis and dewaxing reactions) can include a temperature in a range from about 121° C. (250° F.) to about 399° C. (750° F.), or from about 193° C. (380° F.) to about 316° C. (600° F.). Other FT reaction conditions can include a gauge pressure from about 689 kPa (100 psig) to about 3.44 MPa (500 psig), or from about 1.38 MPa (200 psig) to about 2.76 MPa (400 psig).

The FT catalysts and FT reaction conditions described herein are generally suitable for achieving a conversion of $H_2$ and/or CO ($H_2$ conversion or CO conversion) of at least about 20% (e.g., from about 20% to about 99% or from about 20% to about 75%), at least about 30% (e.g., from about 30% to about 95% or from about 30% to about 65%), or at least about 50% (e.g., from about 50% to about 90% or from about 50% to about 85%). These FT conversion levels may be based on $H_2$ conversion or CO conversion, depending on which reactant is stoichiometrically limited in the synthesis gas feed, considering the FT synthesis reaction chemistry. Preferably, these FT conversion levels are based on CO conversion. These FT conversion levels may be based on "per-pass" conversion, achieved in a single pass through the FT reactor, or otherwise based on overall conversion, achieved by returning a recycle portion of the FT product back to the FT reactor, as described in greater detail below.

A desired $H_2$ conversion and/or CO conversion in the FT reactor(s) may be achieved by adjusting the FT reaction conditions described above (e.g., FT reaction temperature and/or pressure), and/or adjusting the weight hourly space velocity (WHSV). The FT reaction conditions may include a weight hourly space velocity (WHSV) generally from about 0.01 $hr^{-1}$ to about 10 $hr^{-1}$, typically from about 0.05 $hr^{-1}$ to about 5 $hr^{-1}$, and often from about 0.3 $hr^{-1}$ to about 2.5 $hr^{-1}$. As is understood in the art, the WHSV is the weight flow of a total FT feed, for example the synthesis gas feed, any recycle portion of the FT product, and any co-feeds (e.g., auxiliary fluidizing gas) to the reactor, divided by the weight of the catalyst in the reactor and represents the equivalent catalyst bed weights of the total feed stream processed every hour. The WHSV is related to the inverse of the reactor residence time. The conversion level (e.g., CO conversion) may be increased, for example, by increasing pressure and decreasing WHSV, both of which have the effect of increasing reactant concentrations and reactor residence times. The FT reaction conditions may optionally include returning a recycle portion of the FT product, exiting the FT reactor, back to the FT feed for combining with the FT feed, or otherwise back to the FT reactor itself. Recycle operation allows for operation at relatively low "per-pass" conversion through the FT reactor, while achieving a high overall conversion due to the recycle. In some embodiments, this low per-pass conversion may advantageously limit the quantity of high molecular weight hydrocarbons (e.g., normal $C_{20}^+$ hydrocarbons) that can be produced as part of the distribution of hydrocarbons obtained from the FT synthesis reaction.

Preferably, however, the FT reaction conditions include little or even no FT product recycle. For example, the FT reaction conditions may include a weight ratio (i.e., a "recycle ratio") of recycled FT product to synthesis gas feed (and any co-feeds), with this recycled FT product and synthesis gas feed (and any co-feeds) together providing the total FT feed, of generally less than about 1:1, typically less than about 0.5:1, and often less than about 0.1:1. For example, the recycle ratio may be 0, meaning that no FT product recycle is used, such that the per-pass conversion is equal to the overall conversion. With such low recycle ratios, a relatively high per-pass $H_2$ conversion or CO conversion, such as at least about 50% (e.g., from about 50% to about 95%), at least about 70% (e.g., from about 70% to about 92%), or at least about 80% (e.g., from about 80% to about 90%), is desirable in view of process efficiency and economics. As the per-pass conversion level is increased, the distribution of hydrocarbons in the FT product is shifted to those having increased numbers of carbon atoms. This is advantageous in terms of the reduction in yield of light, $C_1$-$C_3$ hydrocarbons, having less value than the desired $C_4^+$ liquid hydrocarbons. In some embodiments, the $C_1$-$C_3$ hydrocarbon yield ("gaseous hydrocarbon yield"), or portion of the total carbon in the CO in the synthesis gas feed (an any co-feeds) provided to the FT reactor, which is converted to $C_1$-$C_3$ hydrocarbons in the net FT product removed from the reactor (excluding any recycle portion), is less than about 30% (e.g., from about 1% to about 30%) or even less than about 20% (e.g., from about 3% to about 20%).

Advantageously, in the absence of FT product recycle, compression costs are saved and the overall process design of the integrated process is simplified. To the extent that this requires an increase in the per-pass conversion and associated shift in the distribution of hydrocarbons of the FT synthesis reaction toward those having increased numbers of carbon atoms, including normal $C_{20}^+$ hydrocarbons that are undesirable, it should be appreciated that aspects of the invention are associated with the discovery of important advantages arising from the in situ conversion of these normal $C_{20}^+$ hydrocarbons to normal and/or branched $C_4$-$C_{19}$ hydrocarbons. These hydrocarbons, resulting from the dewaxing reaction, beneficially contribute to the yield, in the FT product, of desired naphtha boiling-range hydrocarbons, jet fuel boiling-range hydrocarbons, and/or diesel boiling-range hydrocarbons. As described above, the necessary dewaxing activity may be provided by a separate dewaxing catalyst or a dewaxing-functional constituent of a bi-functional catalyst. The in situ dewaxing thereby beneficially converts some or all of a wax fraction of the $C_4^+$ hydrocarbons of the FT synthesis reaction, with this wax fraction referring to hydrocarbons that are solid at room temperature (e.g., comprising the normal $C_{20}^+$ hydrocarbons). In particular, this wax fraction is converted in situ to $C_4$-$C_{19}$ hydrocarbons, according to reactions that include or possibly consist of hydroisomerization and/or hydrocracking reactions. In the absence of such conversion, the wax fraction would not only represent a loss in yield of hydrocarbons having greater utility as liquid fuels, but would also pose significant problems in terms of causing detrimental wax accumulation within the reactor and process piping, in addition to difficulties associated with transporting and blending of final liquid products.

As described above, the dewaxing catalyst or dewaxing-functional constituent of a bi-functional catalyst preferably has activity for hydrocracking and/or hydroisomerization of normal $C_{20}^+$ hydrocarbons that may form as a result of the FT synthesis reaction. These hydrocarbons, characteristic of solid wax, result from the carbon number distribution of normal hydrocarbons produced by the FT reaction chemistry, in conjunction with $C_4$-$C_{19}$ hydrocarbons that are more desirable as components of liquid fuels. As is understood in the art, hydroisomerization refers to reactions of normal hydrocarbons in the presence of hydrogen to produce branched hydrocarbons. Hydrocracking refers to reactions of hydrocarbons with hydrogen to produce hydrocarbons having a lower number of carbon atoms and consequently a lower molecular weight. Hydroisomerization is beneficial for improving characteristics of hydrocarbons having a lower number of carbon atoms (e.g., $C_4$-$C_{19}$ hydrocarbons) and useful as components of liquid fuels, which hydrocarbons may be present in the FT product. These characteristics include a higher octane number (e.g., research octane number and/or motor octane number) of naphtha boiling-range hydrocarbons present in the FT product, and also include a reduced pour point of diesel boiling-range hydrocarbons present in this product, relative to a reference FT product that would otherwise be obtained in the absence of the dewaxing catalyst or dewaxing-functional constituent of a bi-functional catalyst. Hydrocracking is beneficial for its overall impact on the distribution of hydrocarbons otherwise obtained from the FT synthesis reaction alone, such as in a reference FT product. In particular, hydrocracking is beneficial for reducing the percentage by weight of, and possibly eliminating, normal $C_{20}^+$ hydrocarbons present in the FT product. As used herein, a "reference FT product" is a product obtained with all operating variable being the same, except for the absence of the dewaxing catalyst or dewaxing-function constituent of a bi-functional catalyst.

As both hydroisomerization and hydrocracking reactions require hydrogen, in preferred embodiments this hydrogen is present in the synthesis gas feed or total FT feed in a stoichiometric excess of the amount needed for the FT synthesis reaction. Optionally, the total FT feed may comprise a supplemental source of hydrogen, which may also serve as an auxiliary fluidizing gas. Preferably, however, no supplemental source of hydrogen is used, such that hydrogen present in the synthesis gas feed or total FT feed (optionally including hydrogen present in a recycle portion) is sufficient for performing FT synthesis reaction and dewaxing. Whether or not supplemental source of hydrogen is used, according to some embodiments, hydrogen is present in the synthesis gas feed or total FT feed at a concentration of at least about 20 mol-% (e.g., from about 20 mol-% to about 75 mol-%), at least about 30 mol-% (e.g., from about 30 mol-% to about 65 mol-%), or at least about 40 mol-% (e.g., from about 40 mol-% to about 60 mol-%). A representative supplemental source of hydrogen (if used) is hydrogen that has been purified (e.g., by PSA or membrane separation) or hydrogen that is impure (e.g., syngas).

A dewaxing catalyst or dewaxing-functional constituent of a bi-functional catalyst, as described herein and under FT reaction conditions described herein, is generally suitable for achieving a conversion of normal $C_{20}^+$ hydrocarbons (e.g., normal $C_{20}$-$C_{60}$ hydrocarbons) of at least about 80% (e.g., from about 80% to about 100%), at least about 85% (e.g., from about 85% to about 98%), or at least about 90% (e.g., from about 90% to about 95%). Since this conversion occurs in situ, such conversion levels can be determined (calculated) using a reference FT product, as described above, and more specifically by comparing the amount of normal $C_{20}^+$ hydrocarbons obtained in the reference FT product, to that obtained with the use of the dewaxing catalyst or dewaxing-functional constituent of a bi-functional catalyst.

Such high conversion levels are important for improving the quality of the FT product, especially in terms of its ability to be transportable (e.g., via pipeline) as a liquid fuel, without the need for separation or conversion of solid wax. The conversion of normal $C_{20}^+$ hydrocarbons to lower molecular weight, $C_4$-$C_{19}$ hydrocarbons also improves the overall yield of these hydrocarbons, compared to the operation of the FT synthesis reactor without the dewaxing catalyst or dewaxing-functional component of a bi-functional catalyst (i.e., compared to the yield when determined using the reference FT product). Preferably, in the FT product, at least about 75% (e.g., from about 75% to about 100%), at least about 85% (e.g., from about 85% to about 98%), or at least about 90% (e.g., from about 90% to about 97%) of the normal $C_{20}^+$ hydrocarbons, which would otherwise be present in a reference FT product as described herein, are converted to $C_4$-$C_{19}$ hydrocarbons. That is, the yields of $C_4$-$C_{19}$ hydrocarbons from the in situ conversion of normal $C_{20}^+$ hydrocarbons are within these ranges. Preferably, the FT product comprises less than about 2 wt-%, or even less than about 1 wt-% of hydrocarbons that are solid at room temperature (e.g., normal $C_{20}^+$ hydrocarbons). In representative embodiments, normal $C_{20}^+$ hydrocarbons are converted (e.g., at complete or substantially complete conversion and/or within the conversion ranges given above), as a result of using the dewaxing catalyst or dewaxing-functional component of a bi-functional catalyst, with a yield of (i) isoparaffinic (branched) hydrocarbons from about 25% to about 70%, or from about 40% to about 60%, (ii) aromatic hydrocarbons from about 10% to about 35% or from about 15% to about 25%, (iii) gasoline boiling-range hydrocarbons from about 50% to about 95% or from about 70% to about 90%, (iv) diesel boiling-range hydrocarbons from about 5% to about 45% or from about 10% to about 30%, and/or (v) VGO boiling-range hydrocarbons of less than about 1% or less than about 0.5%. These yields refer namely to the percentage of the total carbon in the normal $C_{20}^+$ hydrocarbons, which would otherwise be obtained in a reference FT product as described herein, which is converted to these components in the FT product, obtained with the use of the dewaxing catalyst or dewaxing-functional constituent of a bi-functional catalyst.

Advantageously, isoparaffinic hydrocarbons improve the quality of diesel boiling-range hydrocarbons by reducing both the pour point and the cloud point of this fraction. Both isoparaffinic hydrocarbons and aromatic hydrocarbons improve the quality of gasoline boiling-range hydrocarbons by increasing the octane number (e.g., research octane number and/or motor octane number) of this fraction. In representative embodiments, the gasoline boiling-range hydrocarbons obtained from conversion of normal $C_{20}^+$ hydrocarbons, otherwise present in a reference FT product as described herein, have a research octane number of at least about 75 (e.g., from about 75 to about 85). Properties such as pour point, cloud point, and/or octane number can be determined following the recovery of the appropriate liquid hydrocarbon fraction(s) from the FT product, such as by cooling, condensing, and/or fractionation, as described above.

As described above, conversion levels of normal $C_{20}^+$ hydrocarbons may be below 100% and therefore allow for a portion of these normal $C_{20}^+$ hydrocarbons to be present in the FT product. To achieve complete conversion of normal $C_{20}^+$ hydrocarbons, such as complete in situ conversion to $C_4$-$C_{19}$ hydrocarbons and/or branched $C_{20}^+$ hydrocarbons, the FT reaction conditions may be made more severe, such as by increasing temperature, increasing pressure, and/or decreasing WHSV. However, it is to be understood that complete conversion of normal $C_{20}^+$ hydrocarbons is not a requirement to achieve complete "dewaxing" of the FT product, in the sense being free of solid phase hydrocarbons and therefore comprising liquid fuel fractions that easily transportable, according to preferred embodiments. Incomplete in situ conversion of normal $C_{20}^+$ hydrocarbons (such as achieving conversion levels within certain ranges described above) can nonetheless provide an FT product in which sufficient components resulting from the conversion of normal $C_{20}^+$ hydrocarbons, namely (i) sufficient non-normal $C_{20}^+$ hydrocarbons (e.g., branched $C_{20}^+$ hydrocarbons) having melting points below room temperature (20° C.) and/or (ii) sufficient $C_4$-$C_{19}$ hydrocarbons, are present in the FT product, to the extent that any unconverted normal $C_{20}^+$ hydrocarbons are dissolved at room temperature in liquid fuel fractions recovered from this product, such as by cooling, condensing, and/or fractionation, as described above.

Embodiments of the invention are therefore directed to the use of a dewaxing catalyst or dewaxing-functional constituent of a bi-functional catalyst, to improve the overall selectivities to, and yields of, desired products and/or decrease the overall selectivities to, and yields of, undesired products (particularly wax), relative to performing the FT synthesis reaction in the absence of a dewaxing catalyst or dewaxing-functional constituent of a bi-functional catalyst (i.e., relative to these selectivities and yields, when determined using the reference FT product, as described herein). For example, use of the dewaxing catalyst or dewaxing-functional constituent of a bi-functional catalyst can beneficially convert in situ some or all wax (e.g., at the conversion levels of normal $C_{20}^+$ hydrocarbons as described above) produced by the FT synthesis reaction, thereby decreasing the selectivity to (and/or yield of) wax, relative to the selectivity, when determined using the reference FT product, as described herein. In representative embodiments, the selectivity to (and/or yield of) wax is decreased from a value from about 10% to about 50%, such as from about 20% to about 45%, when determined using the reference FT product as described herein, to a value from about 0% to about 10%, such as from about 0.5% to about 5%, obtained with the use of the dewaxing catalyst or dewaxing-functional constituent of a bi-functional catalyst. Preferably, this selectivity to (and/or yield of) wax is decreased to less than about 0.5%. As described above, small quantities of wax in the FT product can be acceptable to the extent that any unconverted normal $C_{20}^+$ hydrocarbons, and/or any hydrocarbons generally that melt above room temperature, are present in an amount that is below their solubility in liquid fuel fractions recovered from this product (i.e., in an amount such that they may be completely dissolved in such fractions). In other representative embodiments, the selectivity to (and/or yield of) of $C_4$-$C_{19}$ liquid hydrocarbons is increased from a value from about 15% to about 45%, such as from about 20% to about 35%, when determined using the reference FT product as described herein, to a value from about 40% to about 75%, such as from about 50% to about 70%, obtained with the use of the dewaxing catalyst or dewaxing-functional constituent of a bi-functional catalyst. Selectivities to wax or $C_4$-$C_{19}$ hydrocarbons are based on the percentage of carbon in CO that is present in the synthesis gas feed (an any co-feeds) provided to the FT reactor and that is converted by FT, which results in wax or $C_4$-$C_{19}$ liquid hydrocarbons, respectively, in the net FT product (excluding any recycle portion). Yields of wax or $C_4$-$C_{19}$ hydrocarbons are based on the percentage of carbon in CO that is present in the synthesis gas feed (an any co-feeds) provided to the FT reactor (e.g., CO introduced to the FT reactor, whether converted or unconverted), which results in wax or $C_4$-$C_{19}$ liquid hydrocarbons, respectively, in the net FT product (excluding any recycle portion). These (i) decreases in selectivity to (and/or yield of) wax, and/or (ii) increases in selectivity to (and/or yield of) $C_4$-$C_{19}$ liquid hydrocarbons, as a result the use of the dewaxing catalyst or dewaxing-functional constituent of a bi-functional catalyst, can be achieved without a significant difference between the CO conversion obtained when determined using the reference FT product and that obtained using the dewaxing catalyst or dewaxing-functional constituent of a bi-functional catalyst. For example, the CO conversion values obtained in both cases may be within a range as described above. That is, the use of the dewaxing catalyst or dewaxing-functional constituent of a bi-functional catalyst typically does not significantly impact the CO conversion obtained in the FT reactor, such that the CO conversion achieved in both cases may be the same or substantially the same.

The conversion levels of normal $C_{20}^+$ hydrocarbons, as described above, may be based on "per-pass" conversion, achieved in a single pass through the FT reactor, or otherwise based on overall conversion, achieved by returning a recycle portion of the FT product back to the FT reactor, as described above. In the case of recycle, the reference FT product, used to determine this conversion, would likewise be obtained with operating variables that include recycle operation.

Synthesis Gas Feeds

The synthesis gas feed may be any gaseous mixture comprising $H_2$ and CO, and preferably having a molar $H_2$:CO ratio that is advantageous for producing hydrocarbons according to the stoichiometry of the FT synthesis reaction, given above. Representative ratios encompass 2:1, such as from about 1.5:1 to about 2.5:1, from about 1.5:1 to about 2.3:1, and from about 1.8:1 to about 2.2:1. The combined concentration of $H_2$ and CO in this product is generally at least about 35 mol-% (or vol-%) (e.g., from about 35 mol-% to about 85 mol-%), typically at least about 50 mol-% (e.g., from about 50 mol-% to about 80 mol-%), and often at least about 60 mol-% (e.g., from about 60 mol-% to about 75 mol-%). The balance of the synthesis gas product may be all, or substantially all, $CO_2$ and water. Neither water nor $CO_2$ in the synthesis gas feed has an effect on its molar $H_2$:CO ratio which, as described above, is an important parameter with respect to the FT synthesis reaction.

Representative synthesis gas feeds may be obtained from the reforming (e.g., in the presence of steam and/or $CO_2$) of gaseous mixtures comprising methane and/or light hydrocarbons (e.g., $C_2$-$C_3$ or $C_2$-$C_4$ hydrocarbons), as reforming generally produces synthesis gas with favorable molar $H_2$:CO ratios, such as in the ranges described above. Whether or not obtained from reforming, the synthesis gas feed may be subjected to one or more pretreatment steps (upstream of the FT reactor), such as a condensation step to remove liquid phase $H_2O$ or otherwise drying to remove vapor phase $H_2O$, for example using a sorbent selective for water vapor, such as 5 A molecular sieve. Another pretreatment step is $CO_2$ removal, for example by acid gas treating (e.g., amine scrubbing). Yet another pretreatment step is the use of one or more water-gas shift (WGS) reaction stages to increase the hydrogen content and reduce CO content of the synthesis gas feed, or otherwise the use of one or more reverse WGS stages to decrease the hydrogen content and increase the CO content of the synthesis gas feed. Still another pretreatment step is the removal of $H_2S$ and/or other sulfur-bearing contaminants.

In representative embodiments, whether or not pretreatment steps are used, $CO_2$ may be present in the synthesis gas feed in a concentration of generally less than about 45 mol-% (e.g., from about 5 mol-% to about 45 mol-%) and typically less than about 35 mol-% (e.g., from about 10 mol-% to about 35 mol-%). Water may be present in a concentration of generally less than about 20 mol-% (e.g., from about 1 mol-% to about 25 mol-%) and typically less than about 15 mol-% (e.g., from about 5 mol-% to about 15 mol-%). Minor amounts of hydrocarbons (e.g., unconverted hydrocarbons breaking through an upstream reforming reaction) may also be present in the synthesis gas feed. For example, a combined amount of $C_1$-$C_4$ hydrocarbons (e.g., a combined amount of methane, ethane, propane, and butane), which may possibly include only $C_1$-$C_3$ hydrocarbons, may be present in a concentration of less than about 5 mol-% and typically less than about 2 mol-%.

An important source of methane, which may be reformed to provide all or a portion of a synthesis gas feed, is natural gas or a byproduct of natural gas processing. For example, such methane may be present in a hydrogen-depleted pressure swing adsorption (PSA) tail gas, as obtained from hydrogen production processes involving the steam reforming of natural gas. Such methane may also be present in a gaseous effluent from bacterial fermentation that is integrated with a hydrogen production process. Other sources of methane may be derived from coal or biomass (e.g., lignocellulose or char) gasification, or otherwise from a biomass digester that produces biogas from the bacterial digestion of organic waste, such as from anaerobic digestion processes and from landfills. Further sources of methane are effluents from renewable hydrocarbon fuel (biofuel) production processes (e.g., a pyrolysis process, such as a hydropyrolysis processes, or a fatty acid/triglyceride hydroconversion processes). Yet further sources of methane may be obtained from a well head or an effluent of an industrial process including a petroleum refining process (as a refinery off gas), an electric power production process, a steel manufacturing process or a non-ferrous manufacturing process, a chemical (e.g., methanol) production process, or a coke manufacturing process. All or a portion of the methane, which is reformed to provide a synthesis gas feed, may be obtained from a renewable resource (e.g., biomass), for example in the case of methane from a process stream obtained by hydropyrolysis as described in U.S. Pat. No. 8,915,981 assigned to Gas Technology Institute. Accordingly, processes described herein may be used to produce renewable hydrocarbons from a synthesis gas feed, obtained from reforming such methane. Such renewable hydrocarbons may be used to impart an overall reduction in the carbon footprint associated with the synthesis of hydrocarbon-containing fuels, fuel blending components, and/or chemicals, via an FT synthesis reaction as described herein. The carbon in FT products described herein may therefore be derived from a non-renewable source (e.g., natural gas) and/or a renewable source (e.g., biomass), with the latter source imparting such reduction.

The following examples are set forth as representative of the present invention. These examples are not to be construed as limiting the scope of the invention as other equivalent embodiments will be apparent in view of the present disclosure and appended claims.

Example 1

An FT catalyst comprising 20 wt-% Co on an alumina support was analyzed for its surface area and pore size distribution. The surface area was 92.5 $m^2/g$ (Brunauer, Emmett and Teller (BET) method based on nitrogen adsorption (ASTM D1993-03(2008)) and the total pore volume was 0.14 cc/gram (mercury porosimetry), with an average pore diameter of 6.24 nanometers (nm), and with 14% of the pore volume due to macropores of >50 nm, 85% of the pore volume due to mesopores of 2-50 nm, and 1% of the pore volume due to micropores of <2 nm.

An FT synthesis reaction was performed in a fluidized bed reactor containing, as the dense bed phase, a mixture of (i) this FT catalyst and (ii) a dewaxing catalyst comprising 1 wt-% Ga on a ZSM-5 support. The fluidized bed reactor required higher gas flows, relative to those used in comparable fixed bed experiments, to fluidize the catalyst. The fluidized bed reactor diameter was selected to minimize wall effects and obtain good mixing. The mixing characteristics of the fluidized bed reactor for the FT synthesis reaction were especially important because of the high heat release (exothermicity) of this reaction and also the need to avoid stratification of the two types of catalyst. In these tests, the synthesis gas feed was modeled as a gas composition of 60 mol-% $H_2$, 30 mol-% CO, 9 mol-% $CO_2$, and 1 mol-% methane, to simulate a typical product obtained from the reforming of methane. The conditions and results of the fluidized bed experiment, in comparison with those of fixed bed experiments utilizing a separate dewaxing reactor, are summarized in Table 1 below.

TABLE 1

Comparison of FT Synthesis Reaction Conditions

| | Fixed bed experiments | Fluidized bed experiment |
|---|---|---|
| CONDITIONS | | |
| Synthesis gas feed flow rate, liters/min | 1.5 | 6 |
| FT catalyst weight, grams | 61 | 4 |
| Dewaxing catalyst weight, g | 76 | 4 |
| WHSV based on FT catalyst, $hr^{-1}$ | 0.90 | 55 |
| WHSV based on dewaxing catalyst, $hr^{-1}$ | 0.72 | 55 |
| Reactor diameter, mm | 13 | 13 |
| FT synthesis reaction temperature, ° C. | 217 | 241 |
| Pressure, MPa | 2.07 | 2.07 |
| Length/diameter ratio (L/D), FT reactor | 39 | 6.7 |
| L/D, separate dewaxing reactor | 6.4 | — |
| Catalyst particle size, mm | 0.3-1.7 | 0.31-0.38 |
| RESULTS | | |
| CO conversion liters/min | 0.27 | 0.34 |
| CO Conversion, wt- % | 60 | 19 |
| Selectivity to gaseous hydrocarbons, wt- % | 40 | 41 |
| Selectivity to liquid hydrocarbons, wt- % | 60 | 59 |

Relative to the fixed bed experiments, the same amount of CO was converted in the fluidized bed experiment, despite representing a lower percentage conversion due to the high flow rate of the synthesis gas feed, required for fluidization. Importantly, no wax was observed in the fluidized bed experiment. Overall, the results demonstrated that a fluidized bed approach to the FT synthesis reaction with in situ dewaxing would be expected to work on a commercial scale.

In general, aspects of the invention relate to processes and catalyst systems for performing FT synthesis to produce $C_4^+$ hydrocarbons, such as gasoline boiling-range hydrocarbons and/or diesel boiling-range hydrocarbons. Advantageously, catalyst systems described herein have additional activity for in situ hydroisomerization and/or hydrocracking of wax that is generated according to the distribution of hydrocarbons obtained from the FT synthesis reaction. This not only improves the yield of hydrocarbons (e.g., $C_{4-19}$ hydrocarbons) that are useful for transportation fuels, but also allows for alternative reactor types, such as a fluidized bed reactor. Those having skill in the art, with the knowledge gained from the present disclosure, will recognize that various changes can be made to these processes and catalyst systems in attaining these and other advantages, without departing from the scope of the present disclosure. As such, it should be understood that the features disclosed herein are susceptible to modifications and/or substitutions. Specific embodiments illustrated and described herein are for illustrative purposes only, and not limiting of the invention as set forth in the appended claims.

The invention claimed is:

1. A process for producing $C_4^+$ hydrocarbons, the process comprising:
    in a fluidized bed reactor operating under Fischer-Tropsch (FT) reaction conditions, converting $H_2$ and CO in a synthesis gas feed to hydrocarbons, including the $C_4^+$ hydrocarbons, provided in a Fischer-Tropsch (FT) product,
    wherein said fluidized bed reactor contains a catalyst mixture comprising:
        (i) an FT catalyst comprising one or more FT active metals deposited on an FT catalyst support comprising one or more metal oxides, and
        (ii) a dewaxing catalyst comprising a dewaxing active metal deposited on a solid acidic support
    wherein said dewaxing active metal is selected from the group consisting of Groups 12-14 of the Periodic Table, and
    wherein the FT product comprises less than about 2 wt-% of normal $C_{20}^+$ hydrocarbons.

2. The process of claim 1, wherein the one or more FT active metals are selected from the group consisting of cobalt (Co), iron (Fe), ruthenium (Ru), and nickel (Ni).

3. The process of claim 1, wherein the one or more metal oxides are selected from the group consisting of aluminum oxide, silicon oxide, titanium oxide, zirconium oxide, magnesium oxide, and strontium oxide.

4. The process of claim 1, wherein the catalyst mixture has activity for hydroisomerization and/or hydrocracking of said normal $C_{20}^+$ hydrocarbons.

5. The process of claim 1, wherein the dewaxing active metal is selected from the group consisting of Group 13 and Group 14 of the Periodic Table.

6. The process of claim 5, wherein the dewaxing active metal is gallium.

7. The process of claim 1, wherein the solid acidic support is a zeolitic or non-zeolitic molecular sieve having at least about 15 mmol/gram of acid sites, measured by temperature programmed desorption (TPD) of ammonia.

8. The process of claim 1, wherein the solid acidic support is a zeolitic molecular sieve having a silica to alumina molar framework ratio of less than about 50.

9. The process of claim 8, wherein the zeolitic molecular sieve is ZSM-5.

10. The process of claim 1, wherein (i) and (ii) are present in the catalyst mixture in a weight ratio from about 3:1 to about 1:3.

11. A process for producing $C_4^+$ hydrocarbons, the process comprising:
    in a fluidized bed reactor operating under Fischer-Tropsch (FT) reaction conditions, converting $H_2$ and CO in a synthesis gas feed to hydrocarbons, including the $C_4^+$ hydrocarbons, provided in a Fischer-Tropsch (FT) product,
    wherein said fluidized bed reactor contains a bi-functional catalyst comprising, in a single composition:
        (i) an FT-functional constituent comprising an FT active metal and one or more metal oxides; and
        (ii) a dewaxing-functional constituent comprising a dewaxing active metal and a solid acidic support,
    wherein said dewaxing active metal is selected from the group consisting of Groups 12-14 of the Periodic Table, and
    wherein the FT product comprises less than about 2 wt-% of normal $C_{20}^+$ hydrocarbons.

12. The process of claim 11, wherein (i) and (ii) are present in the bi-functional catalyst in a weight ratio from about 3:1 to about 1:3.

13. The process of claim 11, wherein the dewaxing active metal is selected from the group consisting of Group 13 and Group 14 of the Periodic Table.

14. The process of claim 13, wherein the dewaxing active metal is gallium.

15. The process of claim 11, wherein the solid acidic support is a zeolitic or non-zeolitic molecular sieve having at least about 15 mmol/gram of acid sites, measured by temperature programmed desorption (TPD) of ammonia.

16. The process of claim 11, wherein the solid acidic support comprises ZSM-5.

17. The process of claim 1, wherein the dewaxing active metal, selected from Groups 12-14 of the Periodic Table, is present in an amount from about 0.1 wt-% to about 3 wt-%, by weight of the dewaxing catalyst.

18. The process of claim 11, wherein the dewaxing active metal, selected from Groups 12-14 of the Periodic Table, is present in an amount from about 0.1 wt-% to about 3 wt-%, by weight of the dewaxing-functional constituent.

19. The process of claim 1, wherein the FT product comprises less than about 1 wt-% of normal $C_{20}^+$ hydrocarbons.

20. The process of claim 11, wherein the FT product comprises less than about 1 wt-% of normal $C_{20}^+$ hydrocarbons.

* * * * *